(12) United States Patent
Kajita et al.

(10) Patent No.: US 10,431,184 B2
(45) Date of Patent: Oct. 1, 2019

(54) IN-VEHICLE DISPLAY CONTROL DEVICE

(71) Applicant: DENSO CORPORATION, Kariya, Aichi-pref. (JP)

(72) Inventors: Kentaro Kajita, Kariya (JP); Akihiro Ogasawara, Kariya (JP); Kiyotaka Taguchi, Kariya (JP); Gouji Sagai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/322,198

(22) PCT Filed: Jun. 23, 2015

(86) PCT No.: PCT/JP2015/003135
§ 371 (c)(1),
(2) Date: Dec. 27, 2016

(87) PCT Pub. No.: WO2016/006177
PCT Pub. Date: Jan. 14, 2016

(65) Prior Publication Data
US 2017/0154605 A1    Jun. 1, 2017

(30) Foreign Application Priority Data

Jul. 8, 2014  (JP) .................. 2014-140637
Mar. 6, 2015  (JP) .................. 2015-045146

(51) Int. Cl.
*G09G 5/02*     (2006.01)
*G09G 5/377*    (2006.01)
(Continued)

(52) U.S. Cl.
CPC .............. *G09G 5/10* (2013.01); *B60K 35/00* (2013.01); *B60K 37/02* (2013.01); *G09G 3/20* (2013.01);
(Continued)

(58) Field of Classification Search
CPC ............ G09G 5/10; G09G 5/026; G09G 5/06; G09G 5/04; G09G 5/02; G09G 5/377;
(Continued)

(56) References Cited

U.S. PATENT DOCUMENTS

| | | | |
|---|---|---|---|
| 2008/0204438 A1* | 8/2008 | Song .................. | G09G 3/3225 345/207 |
| 2012/0127193 A1* | 5/2012 | Bratt .................. | G09G 5/022 345/590 |
| 2014/0320528 A1* | 10/2014 | Nanba .................. | B60K 35/00 345/629 |

FOREIGN PATENT DOCUMENTS

| | | |
|---|---|---|
| JP | 2005352177 A | 12/2005 |
| JP | 2007091030 A | 4/2007 |
| JP | 2013166400 A | 8/2013 |

* cited by examiner

*Primary Examiner* — Vijay Shankar
*Assistant Examiner* — Cory A Almeida
(74) *Attorney, Agent, or Firm* — Harness, Dickey & Pierce, P.L.C.

(57) ABSTRACT

An in-vehicle display control device includes: an image acquisition unit that acquires a plurality of element images to be displayed on a vehicular display from each image generation unit; a change information acquisition unit that acquires color change information; and an image synthesizing unit that generates a synthetic image based on a color in the color change information and the plurality of element images. The image synthesizing unit generates the synthetic image by synthesizing the plurality of element images and a color change layer.

9 Claims, 6 Drawing Sheets

(51) Int. Cl.
   *G09G 5/10*      (2006.01)
   *B60K 35/00*     (2006.01)
   *G09G 5/04*      (2006.01)
   *G09G 5/06*      (2006.01)
   *B60K 37/02*     (2006.01)
   *G09G 3/20*      (2006.01)
   *G09G 5/14*      (2006.01)
   *G09G 5/395*     (2006.01)

(52) U.S. Cl.
   CPC .............. *G09G 5/02* (2013.01); *G09G 5/026* (2013.01); *G09G 5/04* (2013.01); *G09G 5/06* (2013.01); *G09G 5/14* (2013.01); *G09G 5/377* (2013.01); *G09G 5/395* (2013.01); *B60K 2370/152* (2019.05); *B60K 2370/155* (2019.05); *B60K 2370/188* (2019.05); *B60K 2370/349* (2019.05); *B60K 2370/52* (2019.05); *G09G 2320/0233* (2013.01); *G09G 2320/0242* (2013.01); *G09G 2340/10* (2013.01); *G09G 2340/12* (2013.01); *G09G 2340/125* (2013.01); *G09G 2360/18* (2013.01); *G09G 2380/10* (2013.01)

(58) Field of Classification Search
   CPC . G09G 5/20; G09G 5/14; G09G 5/395; B60K 37/02; B60K 35/00
   See application file for complete search history.

| LEVEL | RGBA VALUE |
|---|---|
| 0 | (0, 0, 0, 255) |
| 1 | ... |
| 2 | ... |
| 3 | (128, 128, 128, 128) |
| 4 | ... |
| 5 | ... |
| 6 | ... |
| 7 | ... |
| 8 | ... |
| 9 | ... |
| 10 | (255, 255, 255, 128) |

| BEFORE CHANGE | AFTER CHANGE |
|---|---|
| (R0, G0, B0, A0) | (R10, G10, B10, A10) |
| (R1, G1, B1, A1) | (R11, G11, B11, A11) |
| (R2, G2, B2, A2) | (R12, G12, B12, A12) |
| ... | ... |
| ... | ... |
| ... | ... |
| ... | ... |
| ... | ... |
| ... | ... |
| ... | ... |
| ... | ... |

IN-VEHICLE DISPLAY CONTROL DEVICE

CROSS REFERENCE TO RELATED APPLICATIONS

This application is a U.S. National Phase Application under 35 U.S.C. 371 of International Application No. PCT/JP2015/003135 filed on Jun. 23, 2015 and published in Japanese as WO 2016/006177 A1 on Jan. 14, 2016. This application is based on and claims the benefit of priority from Japanese Patent Application No. 2014-140637 filed on Jul. 8, 2014, and Japanese Patent Application No. 2015-045146 filed on Mar. 6, 2015. The entire disclosures of all of the above applications are incorporated herein by reference.

TECHNICAL FIELD

The present disclosure relates to an in-vehicle display control device that displays images generated by a plurality of image generation units on one display and changes the color thereof.

BACKGROUND ART

There is known a technique for displaying, for example, a meter image on a display mounted on a vehicle. For example, Patent Literature 1 discloses a technique for displaying meter images representing the vehicle speed and the engine RPM on one display and displaying a map image between the meter images.

When a plurality of images are displayed on one display, a plurality of image generation devices may generate the respective images. For example, a meter ECU may generate the meter images representing the vehicle speed and the engine RPM, and an ECU of a navigation device may generate the map image.

A video interface mounted on the vehicle may acquire an image generated by an external device, and the acquired image may be displayed on the display together with the above meter images.

An instruction for changing the colors of the plurality of images displayed on the display may be performed, for example, when a user performs an operation of adjusting the brightness of the display, or when an image display mode is changed from a daytime mode to a nighttime mode. Further, for example, a first image generation device and a second image generation device may respectively generate a first image and a second image.

In order to change the colors of the plurality of images displayed on the display, the first image generation device and the second image generation device may respectively change the color of the first image and the color of the second image, and the first image with the color changed and the second image with the color changed may be synthesized.

Further, it is often difficult to transmit a signal representing an instruction for changing color to an external device to change the color in the external device. Thus, when either the first image generation device or the second image generation device (here, the second image generation device) is an external device, the color of the second image may be changed in an image acquisition unit such as a video interface which acquires an image from the external device. Also when the color of the second image is changed in the image acquisition unit, the color of the first image and the color of the second image are changed by the different devices.

When the first image and the second image are synthesized after the change of the colors by the different devices, a timing of changing color is highly likely to differ between a part corresponding to the first image and a part corresponding to the second image in the synthetic image.

Although the first image and the second image are displayed on the same display, the difference in the timing of changing color between the part corresponding to the first image and the part corresponding to the second image disadvantageously gives a sense of incongruity to a user. Similarly, as a matter of course, this problem occurs also when a synthetic image is obtained by synthesizing element images generated by three or more image generation units.

PRIOR ART LITERATURES

Patent Literature

Patent Literature 1: JP-2007-91030-A

SUMMARY OF INVENTION

It is an object of the present disclosure to provide an in-vehicle display control device capable of synchronously changing the colors of a plurality of element images constituting a synthetic image.

According to an aspect of the present disclosure, an in-vehicle display control device includes: an image acquisition unit that acquires a plurality of element images to be displayed on a display mounted on a vehicle from a plurality of image generation units; a change information acquisition unit that acquires color change information; and an image synthesizing unit that generates a synthetic image having a color based on the color change information acquired by the change information acquisition unit, the synthetic image being obtained by synthesizing the plurality of element images acquired by the image acquisition unit. The image synthesizing unit generates the synthetic image by synthesizing the plurality of element images acquired by the image acquisition unit and a color change layer having a color determined based on the color change information acquired by the change information acquisition unit.

In the above in-vehicle display control device, the color of the color change layer that is prepared separately from the plurality of element images is determined based on the color change information acquired by the change information acquisition unit. Further, the color of the synthetic image is determined, not by individually changing the colors of the respective element images, but by synthesizing the color change layer with the plurality of element images acquired by the image acquisition unit. Thus, the colors of the plurality of element images acquired form the plurality of image generation units, the element images being included in the synthetic image, can be simultaneously changed.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
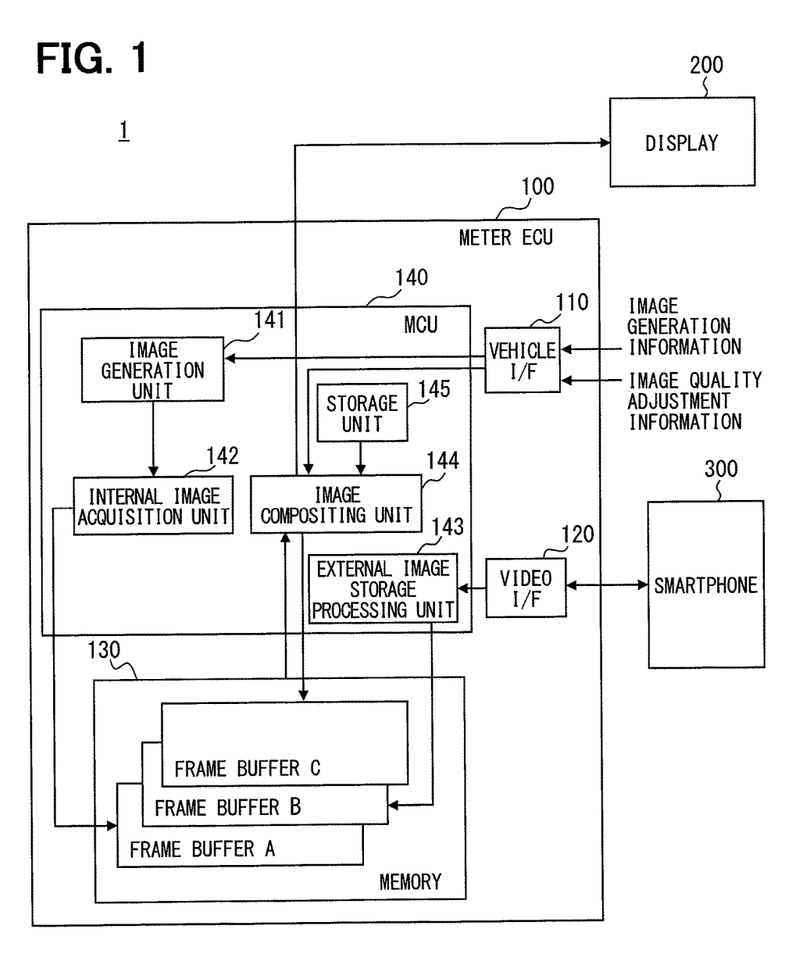
FIG. 1 is a configuration diagram of an in-vehicle display system which includes a meter ECU as an embodiment of an in-vehicle display control device of the present disclosure.

Hereinbelow, an embodiment of the present disclosure will be described with reference to the drawings. An in-vehicle display system 1 illustrated in FIG. 1 is provided with a meter ECU 100 which is an embodiment of an in-vehicle display control device of the present disclosure and a display 200. The meter ECU 100 and the display 200 are mounted on a vehicle.

The meter ECU 100 is provided with a vehicle interface 110, a video interface 120, a memory 130, and a micro controller unit (MCU) 140.

A signal from another device inside the vehicle is input to the vehicle interface 110. That is, the vehicle interface 110 acquires a signal from another device inside the vehicle. Signals acquired by the vehicle interface 110 include a signal representing image quality adjustment information (hereinbelow, merely referred to as image quality adjustment information) and a signal representing image generation information (hereinbelow, merely referred to as image generation information). When the image quality is adjusted, the color of an image is changed. Thus, the image quality adjustment information corresponds to color change information. Further, the vehicle interface 110 which acquires the image quality adjustment information corresponds to a change information acquisition unit. Specifically, the image quality adjusted in the present embodiment is brightness. The image quality adjustment information represents the level of brightness in eleven stages of 0 to 10. The image quality adjustment information is input to the vehicle interface 110, for example, when a user performs a brightness adjusting operation.

Figure 2:
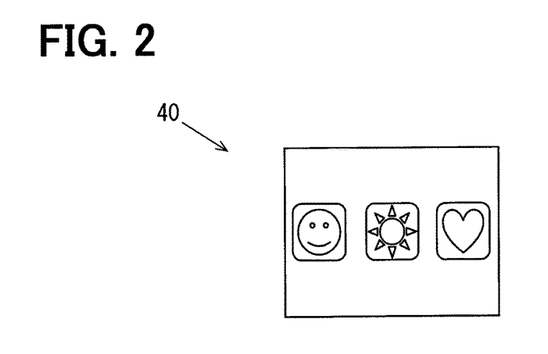
FIG. 2 is a diagram conceptually illustrating an example of a terminal image acquired by a video interface.

A smartphone 300 is connected to the video interface 120. The smartphone 300 is an external device which does not constitute the in-vehicle display device 1. The video interface 120 acquires a signal representing an image (hereinbelow, referred to as a terminal image) 40 generated by the smartphone 300 and sequentially outputs the acquired signals to the MCU 140 by hardware processing by, for example, FPGA. FIG. 2 is an example of the terminal image 40. The terminal image 40 corresponds to an element image to be an element of a synthetic image displayed on the display 200. The smartphone 300 which generates the terminal image 40 corresponds to an image generation unit.

The video interface 120 which acquires the terminal image 40 from the smartphone 300 functions as an image acquisition unit.

In the present embodiment, the memory 130 is a RAM and provided with a frame buffer A, a frame buffer B, and a frame buffer C as storage areas.

The MCU 140 mainly includes a microcomputer which includes a CPU, a ROM, and a RAM. The MCU 140 executes functions as an image generation unit 141, an internal image acquisition unit 142, an external image storage processing unit 143, and an image synthesizing unit 144 by executing various control programs stored in the ROM by the CPU. The MCU 140 is also provided with a storage unit 145. Some or all of the functions executed by the MCU 140 may be configured as hardware by one or a plurality of ICs.

The image generation unit 141 sequentially acquires image generation information through the vehicle interface 110. Then, the image generation unit 141 generates a meter image 50 as an element image based on the acquired image generation information.

Figure 3:
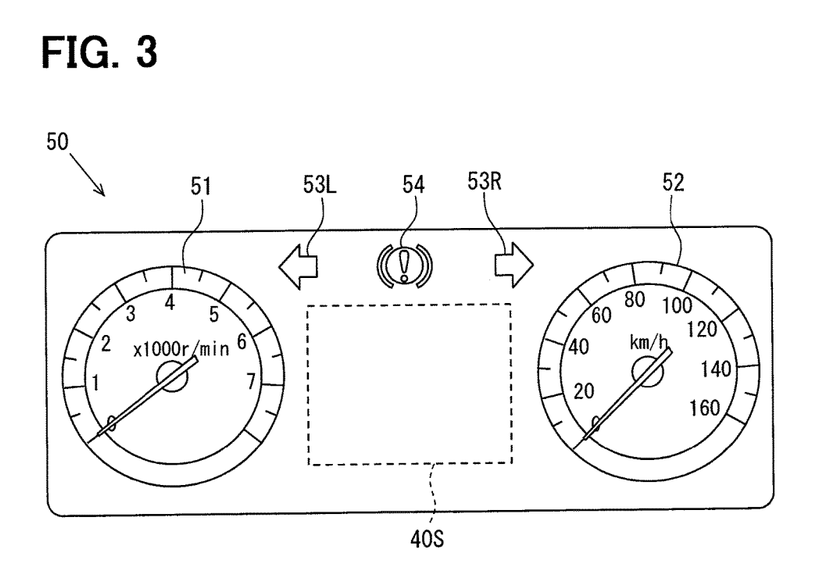
FIG. 3 is a diagram illustrating an example of a meter image acquired by an internal image acquisition unit.

FIG. 3 illustrates an example of the meter image 50. As illustrated in FIG. 3, the meter image 50 includes an RPM display image 51 which represents the RPM of an engine, a vehicle speed display image 52 which represents a current vehicle speed, direction indication images 53L, 53R which indicate a lighting state of a direction indicator lamp, and an alarm display image 54 which notifies a driver of an abnormality of the own vehicle. The RPM display image 51 and the vehicle speed display image 52 are disposed across an area 40S for displaying the terminal image 40.

The internal image acquisition unit 142 sequentially acquires the meter images 50 generated by the image generation unit 141 as an element inside the vehicle and stores the acquired meter images 50 in the frame buffer A. The external image storage processing unit 143 stores the terminal images 40 sequentially acquired from the smartphone 300 as an external device by the video interface 120 in the frame buffer B.

The image synthesizing unit 144 synthesizes the meter image 50 stored in the frame buffer A and the terminal image 40 stored in the frame buffer B. Hereinbelow, the thus-obtained image is referred to as an element synthetic image. The element synthetic image and the frame buffer C as an image quality adjustment layer, that is, a color change layer are synthesized by alpha blending to generate a synthetic image with the image quality adjusted. Then, the synthetic image with the image quality adjusted is output to the display 200. The processing of the image synthesizing unit 144 will be described in detail below with reference to FIG. 5.

Figure 4:
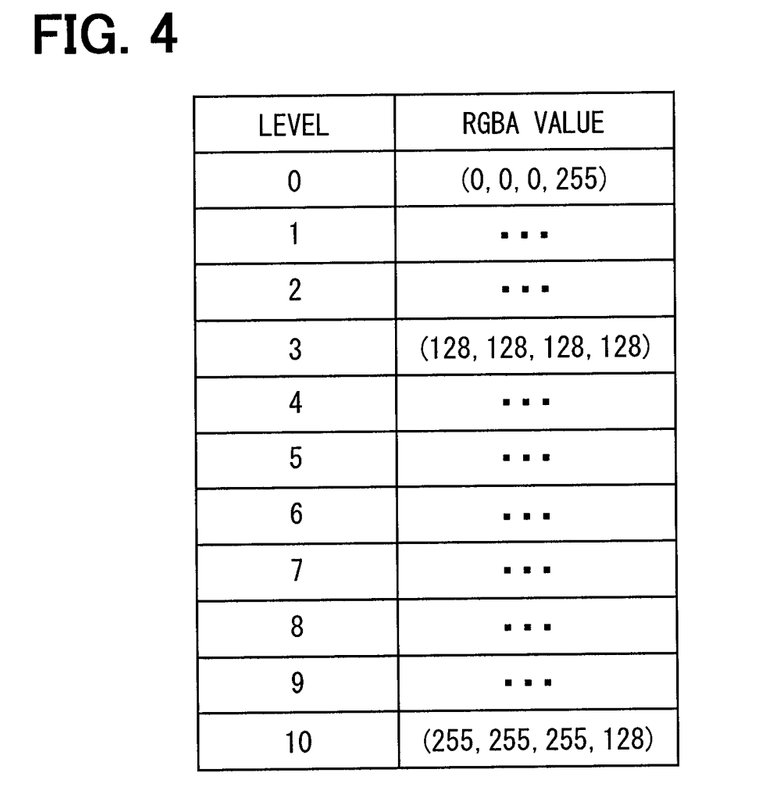
FIG. 4 is a diagram describing an image quality adjustment table.

An image quality adjustment table is stored in the storage unit 145. The image quality adjustment table corresponds to a color change table. The image quality adjustment table represents the relationship between image quality adjustment information and an RGBA value of the frame buffer C. FIG. 4 illustrates an example of the image quality adjustment table.

In FIG. 4, a level corresponds to image quality adjustment information. In the example of FIG. 4, the level is divided into eleven stages of 0 to 10. In an RGBA value corresponding to each of the levels, an R value, a G value, and a B value are equal to each other and determined based on the level. Thus, in the image quality adjustment table of FIG. 4, the depth of black in color changes with white-black monotone from white of (R, G, B)=(255, 255, 255) to black of (R, G, B)=(0, 0, 0).

On the other hand, the maximum A value is 255, and A=255 represents opacity and A=0 represents transparency. As the A value increases, the degree of transparency is reduced. In the image quality adjustment table of FIG. 4, the A value is not 255 except in the level 0. As described above, the image quality adjustment table of FIG. 4 has semitransparent RGBA values in which only the depth of black changes with white-black monotone except in the level 0. The image quality adjustment table having the RGBA values set in this manner is a table for adjusting the brightness of a synthetic image.

The display 200 is placed at a position that can be visually recognized by a driver, for example, in front of a driver's seat inside a cabin of the vehicle and displays a synthetic image generated by the image synthesizing unit 144.

Figure 5:
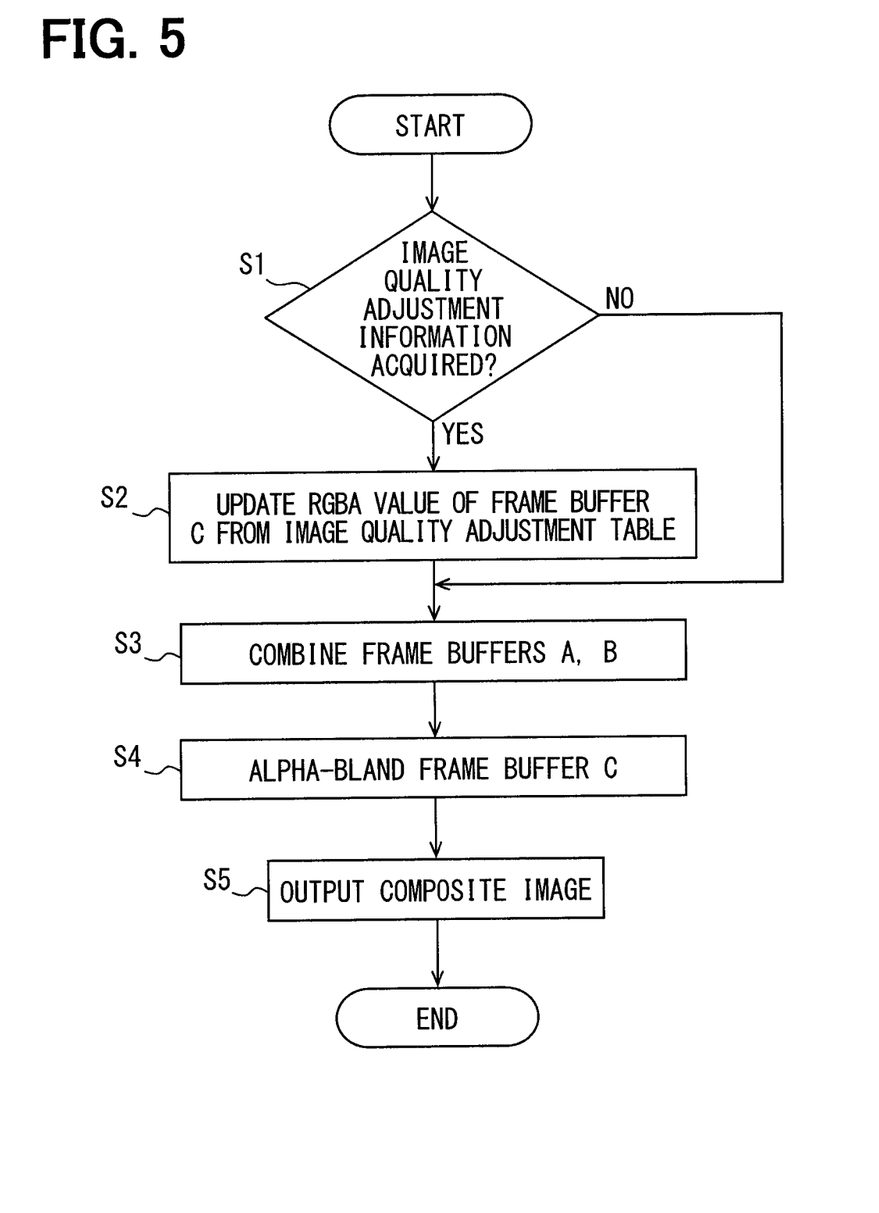
FIG. 5 is a flow chart illustrating processing executed by an image synthesizing unit of FIG. 1.

Next, the processing of the image synthesizing unit 144 will be described in detail with reference to FIG. 5. The image synthesizing unit 144 periodically executes the processing illustrated in FIG. 5.

In step S1, it is determined whether image quality adjustment information has been acquired. That is, it is determined whether the image quality adjustment information has been input to the vehicle interface 110. When the determination is NO, the processing proceeds to step S3 without executing step S2. When the determination is YES, the processing proceeds to step S2.

In step S2, the RGBA value of the frame buffer C is updated based on the image quality adjustment information acquired by the vehicle interface 110 and the image quality adjustment table stored in the storage unit 145. All pixels of the frame buffer C have the same RGBA value which is determined by the image quality adjustment information and the image quality adjustment table. When the update of the RGBA value of the frame buffer C has never been performed, the RGBA value of the frame buffer C is a predetermined initial value.

Figure 6:
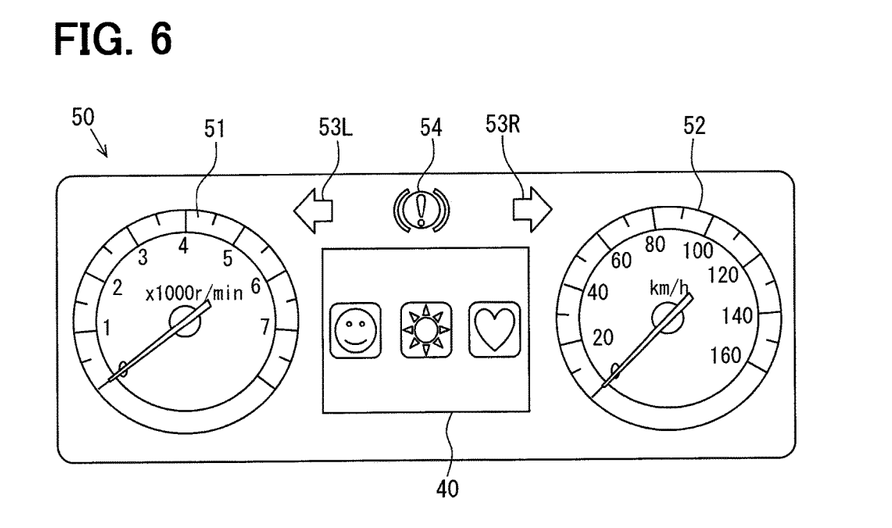
FIG. 6 is a diagram illustrating an example of an element synthetic image obtained in step S3 of FIG. 5.

In step S3, the frame buffers A, B are synthesized to generate an element synthetic image. FIG. 6 is an example of the element synthetic image obtained by executing step S3. In the example of FIG. 6, the meter image 50 and the terminal image 40 as element images are synthesized.

In step S4, the frame buffer C is alpha-blended with the element synthetic image generated in step S3. The alpha blending means calculating the following equations for each pixel of the element synthetic image when an RGBA value of each pixel of the element synthetic image is ($R_{AB}$, $G_{AB}$, $B_{AB}$, $A_{AB}$), an RGBA value of the frame buffer C is ($R_C$, $G_C$, $B_C$, $A_C$), and an RGBA value of each pixel of the synthetic image obtained by the alpha blending is ($R_{ABC}$, $G_{ABC}$, $B_{ABC}$, $A_{ABC}$).

$$R_{ABC}=R_C \times A_C/255+R_{AB} \times (255-A_C)/255$$

$$G_{ABC}=G_C \times A_C/255+G_{AB} \times (255-A_C)/255$$

$$B_{ABC}=B_C \times A_C/255+B_{AB} \times (255-A_C)/255$$

$$A_{ABC}=A_C \times A_C/255+A_{AB} \times (255-A_C)/255$$

Figure 7:
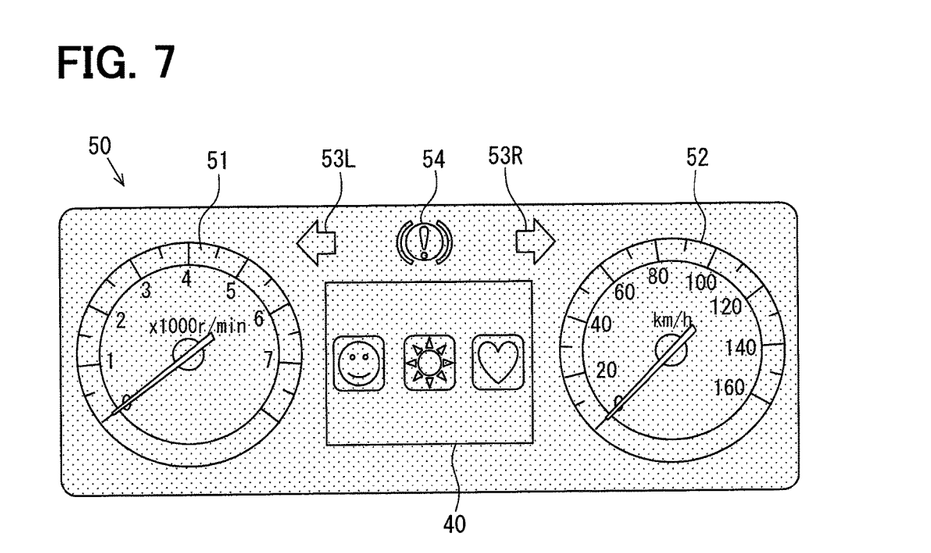
FIG. 7 is a diagram illustrating an example of a synthetic image displayed on a display.

In step S5, a signal representing the synthetic image generated in step S4 is output to the display 200. FIG. 7 is an example of the synthetic image displayed on the display 200 by executing step S5. The frame buffer C is alpha-blended with the element synthetic image to adjust the brightness of the synthetic image. Thus, in the synthetic image, the brightness of a part corresponding to the terminal image 40 and the brightness of a part corresponding to the meter image 50 simultaneously change.

In the present embodiment described above, the frame buffer C is prepared in addition to the frame buffer A which stores the terminal image 40 and the frame buffer B which stores the meter image 50. The RGBA value of the frame buffer C is determined based on the image quality adjustment information (S2). The brightness of the synthetic image is adjusted, not by individually adjusting the brightness of the terminal image 40 and the brightness of the meter image 50, but by alpha-blending the frame buffer C with the element synthetic image obtained by synthesizing the terminal image 40 and the meter image 50 (S4). Thus, the brightness of the terminal image 40 and the brightness of the meter image 50, the terminal image 40 and the meter image 50 being included in the synthetic image, can be simultaneously adjusted.

Second Embodiment

Next, a second embodiment will be described. In the description for the second and subsequent embodiments, an element having the same reference sign as a previously-used reference sign is identical with an element having the previously-used reference sign in the previous embodiment unless otherwise specifically noted. When only a part of the configuration is described, the previously-described embodiment can be applied to the other part of the configuration.

An in-vehicle display system of the second embodiment is also provided with the elements illustrated in FIG. 1. However, an element described below has a different function from the first embodiment.

Figure 8:
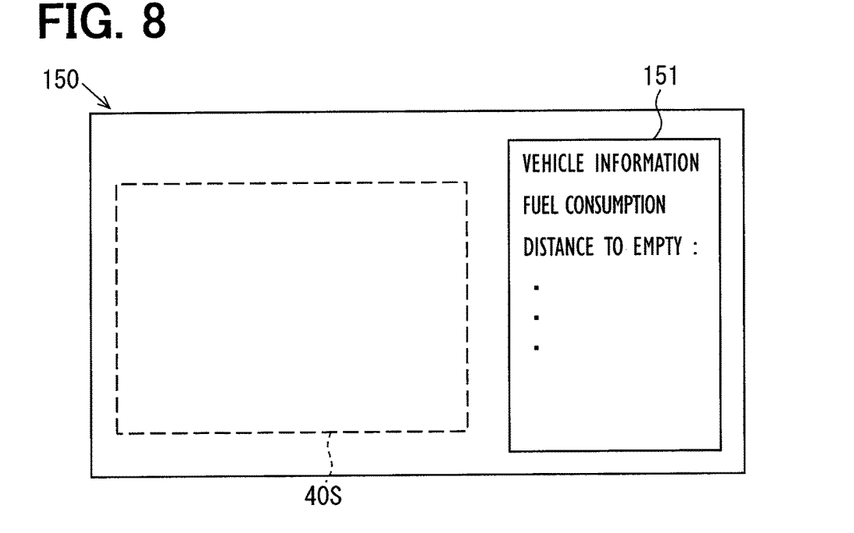
FIG. 8 is a diagram illustrating a driving support image displayed on a display in a second embodiment.

In the second embodiment, a driving support image 150 illustrated in FIG. 8 is displayed on a display 200. The driving support image 150 includes a vehicle information image 151 which displays various pieces of vehicle information such as the fuel consumption and the distance to empty. Similarly to the first embodiment, the driving support image 150 includes an area 40S for displaying a terminal image 40.

Figure 9:
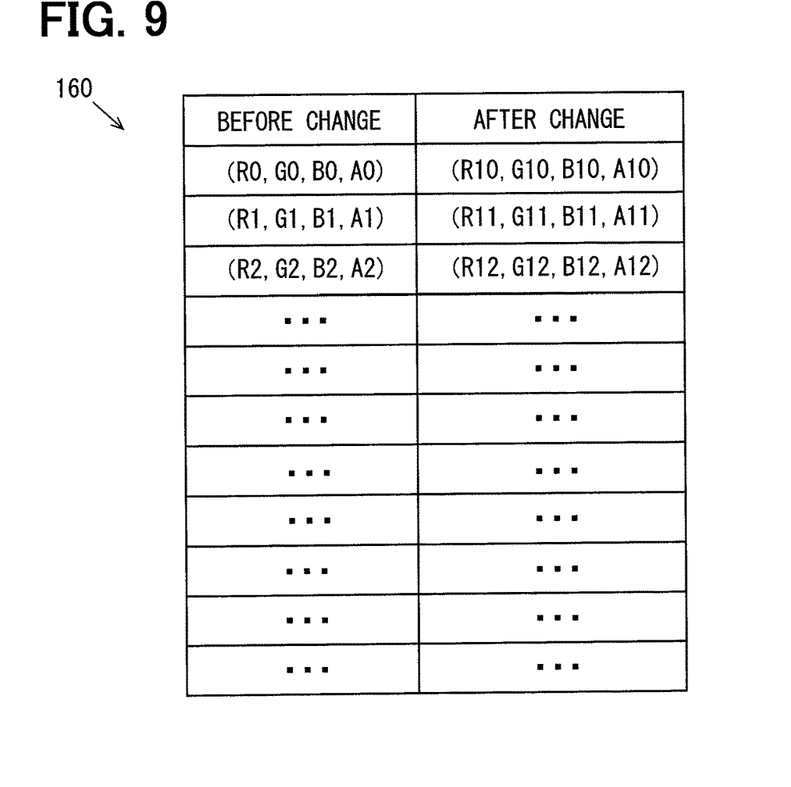
FIG. 9 is a diagram illustrating a color information correspondence table stored in a storage unit in the second embodiment.

A color information correspondence table 160 conceptually illustrated in FIG. 9 is stored in a storage unit 145. The color information correspondence table 160 is a correspondence table between color information before change and color information after change. Specifically, the color information is an RGBA value. In FIG. 9, Rn, Gn, Bn, An (n=0, 1, 2 . . . ) take numerical values.

In the color information correspondence table 160, the color information before change includes color information about various colors used in the driving support image 150. In the present embodiment, two color information correspondence tables 160 are stored. One of the color information correspondence tables 160 is a daytime mode color information correspondence table 160, and the other color information correspondence table 160 is a nighttime mode color information correspondence table 160. The color information after change in the daytime mode and the color information after change in the nighttime mode corresponding to the same color information before change have different hues. Thus, the use of color differs between the daytime mode and the nighttime mode. The nighttime mode uses a darker shade than the daytime mode.

An image generation unit 141 generates the vehicle information image 151 illustrated in FIG. 8. An internal image acquisition unit 142 sequentially acquires the vehicle information images 151 generated by the image generation unit 141 and stores the acquired vehicle information images 151 in the frame buffer A. An external image storage processing unit 143 is the same as that of the first embodiment and stores the terminal images 40 sequentially acquired from a smartphone 300 by a video interface 120 in the frame buffer B.

An image synthesizing unit 144 synthesizes the vehicle information image 151 stored in the frame buffer A and the terminal image 40 stored in the frame buffer B to generate an element synthetic image. Then, the image synthesizing unit 144 acquires mode information that indicates which one of the modes, the daytime mode or the nighttime mode, to employ through the vehicle interface 110. The mode information corresponds to the color change information.

The image synthesizing unit 144 determines which one of the tables, the daytime mode color information correspondence table 160 or the nighttime mode color information correspondence table 160, to use based on the acquired mode information. Then, the image synthesizing unit 144 uses color information of each pixel of the element synthetic image as the color information before change to determine color information of a pixel corresponding to each pixel of the element synthetic image in the frame buffer C as a color change layer from the determined color information correspondence table 160. In the frame buffer C, color information other than the part corresponding to the element synthetic image has an initial value. Then, the frame buffer C is superimposed on the element synthetic image to generate a synthetic image. This synthesis is not alpha blending, but an image using color information of the upper layer.

In the second embodiment, either the daytime mode color information correspondence table 160 or the nighttime mode color information correspondence table 160 is selected based on the mode information acquired through the vehicle interface 110. Then, color information of the frame buffer C is determined based on the selected color information correspondence table 160 and color information of each pixel of the element synthetic image, and the frame buffer C is superimposed on the element synthetic image to determine the color of the synthetic image.

In this manner, the color of the synthetic image is determined, not by individually changing the colors of the respective element images, but by superimposing the frame buffer C on the element synthetic image. This enables the colors of a plurality of element images acquired from the image generation unit 141 and the smartphone 300 to be simultaneously changed.

Third Embodiment

In a third embodiment, an image compositing unit 144 uses a known color matrix represented by Formula (1) to determine color information of a pixel corresponding to an element composite image in the frame buffer C. The color matrix corresponds to a color change matrix. The change of color using the color matrix represented by Formula (1) is a known technique, and e, j, o, t are always 0 and y is always 1.

[Formula 1]

$$\begin{pmatrix} a & b & c & d & e \\ f & g & h & i & j \\ k & l & m & n & o \\ p & q & r & s & t \\ u & v & w & x & y \end{pmatrix} \quad (1)$$

When color information before change is $(R_{bf}, G_{bf}, B_{bf}, A_{bf})$ and color information after change is $(R_{af}, G_{af}, B_{af}, A_{af})$, the color information after change is determined by calculation represented by Formula (2).

[Formula 2]

$$(R_{bf}\ B_{bf}\ G_{bf}\ A_{bf}\ 1) \times \begin{pmatrix} a & b & c & d & e \\ f & g & h & i & j \\ k & l & m & n & o \\ p & q & r & s & t \\ u & v & w & x & y \end{pmatrix} = (R_{af}\ B_{af}\ G_{af}\ A_{af}\ 1) \quad (2)$$

For example, when the red element is doubled, and 0.2 is added to each of the red, green and blue elements with respect to the color information before change (0.2, 0.0, 0.4, 1.0), the color information after change is obtained by the following Formula (3).

[Formula 3]

$$(0.2\ 0.0\ 04\ 1.0\ 1) \times \begin{pmatrix} 2 & 0 & 0 & 0 & 0 \\ 0 & 1 & 0 & 0 & 0 \\ 0 & 0 & 1 & 0 & 0 \\ 0 & 0 & 0 & 1 & 0 \\ 0.2 & 0.2 & 0.2 & 0 & 1 \end{pmatrix} = (0.6\ 0.2\ 0.6\ 1.0\ 1) \quad (3)$$

In this manner, color information of a pixel corresponding to each pixel of the element synthetic image in the frame buffer C is determined. The other configuration is the same as that of the second embodiment. Thus, also in the third embodiment, the colors of a plurality of element images acquired from the image generation unit 141 and the smartphone 300 can be simultaneously changed.

Although, the embodiments of the present disclosure have been described above, the present disclosure is not limited to the above embodiments. The following modifications are also included in the technical scope of the present disclosure. Further, in addition to the following modifications, various changes can be made without departing from the gist of the present disclosure.

First Modification

For example, in the first embodiment, color other than brightness such as shade or saturation may be changed instead of or in addition to the brightness of the synthetic image. When the shade or saturation is changed, the RGB values of the image quality adjustment table are set to be different between the levels.

Second Modification

In the above embodiments, the two elements images, specifically, the terminal image 40 and the meter image 50 are used. However, the number of element images may be three or more.

Third Modification

In the above embodiments, the meter image 50 which is one of the element images is generated by the MCU 140 which includes the image synthesizing unit 144. However, the element image may be generated by an in-vehicle device other than the meter ECU 100. Alternatively, the element image may be acquired from an external device other than the smartphone 300.

Fourth Modification

In the first embodiment, the area 40S which includes no figure is formed on the meter image 50 for synthesizing the terminal image 40. In the synthetic image, the terminal image 40 is located in the area 40S. However, figures of a plurality of element images may be superimposed in the synthetic image.

Fifth Modification

Although, in the second embodiment, the two color information correspondence tables 160 for the daytime mode and the nighttime mode are provided, the present disclosure is not limited thereto. For example, a color information correspondence table 160 that corresponds to each of a plurality of themes and collectively changes the display color on a screen may be provided like a display connected to a computer. In this case, information indicating which theme has been designated is acquired as the color change information.

Sixth Modification

In the third embodiment, the calculation of Formula (3) strengthens red color and parallelly translates colors. Alternatively, various changes relating to color can be performed by changing values of components constituting the color matrix to change the brightness, change contrast, and increase or decrease one color element by the ratio with another color element.

Seventh Modification

In the above embodiments, the meter image 50 and the driving support image 150 are described as examples of the synthetic image. However, the present disclosure can be applied to synthetic images displayed on various displays in a vehicle. For example, when an image displayed on a center display is a synthetic image, the present disclosure can also be applied to the synthetic image.

It is noted that a flowchart or the processing of the flowchart in the present application includes sections (also referred to as steps), each of which is represented, for instance, as S1. Further, each section can be divided into several sub-sections while several sections can be synthesized into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various synthesizations and configurations, other synthesizations and configurations, including more, less or only a single element, are also within the spirit and scope of the present disclosure.

The invention claimed is:

1. An in-vehicle display control device comprising:
    a vehicle interface configured to acquire color change information;
    a microcomputer configured to:
    acquire a plurality of element images to be displayed on a display mounted on a vehicle;
    acquire color change information; and
    generate a synthetic image having a color based on the color change information acquired by the vehicle interface, the synthetic image being obtained by synthesizing the plurality of element acquired images, wherein:
    the microcomputer is configured to generate the synthetic image by synthesizing the plurality of acquired element images and a color change layer having a color determined based on the color change information acquired by the vehicle interface;
    the color change layer has an RGBA value that is determined based on the color change information acquired by the vehicle interface;
    the microcomputer is configured to generate the synthetic image by synthesizing the plurality of acquired element images and the color change layer by alpha blending;
    the microcomputer is further configured to set a value as color information of each pixel corresponding to the element images in the color change layer, the value set as color information of each pixel corresponding to the element images in the color change layer being obtained by multiplying color information of each pixel of the plurality of element images acquired by the microcomputer by a color change matrix determined based on the color change information acquired by the microcomputer;
    the color information of each pixel of the plurality of element images acquired by the microcomputer has a RGBA value; and
    the color information of each pixel corresponding to the element images in the color change layer has another RGBA value.

2. The in-vehicle display control device according to claim 1, wherein the microcomputer is further configured to store
    a color change table indicative of a relationship between the color change information and the RGBA value of the color change layer,
    and to determine the RGBA value of the color change layer based on the color change information acquired by the microcomputer and the color change table stored in the microcomputer.

3. The in-vehicle display control device according to claim 1, wherein:
    the microcomputer is further configured to acquire information indicative of a level of a brightness of an image as the color change information, and
    determine an R value, a G value and a B value of the color change layer to be a same value, and sets the R value, the G value, and the B value determined based on the color change information.

4. The in-vehicle display control device according to claim 1, wherein the microcomputer is further configured to store
    a plurality of color information correspondence tables as correspondence tables between color information before change and color information after change,
    and to select one of the plurality of color information correspondence tables based on the color change information acquired by the microcomputer, and determine color information of each pixel corresponding to the element images in the color change layer using selected one of the color information correspondence tables and color information of each pixel of the element images.

5. The in-vehicle display control device according to claim 1, wherein:
the microcomputer includes a video interface.

6. The in-vehicle display control device according to claim 1, wherein:
the microcomputer is further configured to display the synthetic image on the display mounted on the vehicle based on the value set as color information of each pixel corresponding to the element images in the color change layer.

7. The in-vehicle display control device according to claim 1, wherein the color change matrix has dimensions of 4×4 or more.

8. The in-vehicle display control device according to claim 1, wherein:
the color information of each pixel of the plurality of element images acquired by the microcomputer is defined by a matrix with dimensions of 1×4 or more; and
the color information of each pixel corresponding to the element images in the color change layer is defined by another matrix with dimensions of 1×4 or more.

9. The in-vehicle display control device according to claim 1, wherein:
the color change matrix has dimensions of 5×5;
the color information of each pixel of the plurality of element images acquired by the microcomputer is defined by a matrix of (R, G, B, A, 1);
the color information of each pixel corresponding to the element images in the color change layer is defined by another matrix of (R, G, B, A, 1); and
R indicates a R value, G indicates a G value, B indicates a B value, and A indicates a transparency degree.

* * * * *